(12) United States Patent
Monk et al.

(10) Patent No.: US 7,110,573 B2
(45) Date of Patent: Sep. 19, 2006

(54) VALIDATION AND VERIFICATION APPARATUS AND METHOD

(75) Inventors: Bruce C. Monk, Hudson, NH (US); Theodore T. Kuklinski, Weston, MA (US)

(73) Assignee: AssureTec Systems, Inc., Manchester, NH (US)

( * ) Notice: Subject to any disclaimer, the term of this patent is extended or adjusted under 35 U.S.C. 154(b) by 0 days.

(21) Appl. No.: 11/156,885

(22) Filed: Jun. 20, 2005

(65) Prior Publication Data

US 2005/0229010 A1    Oct. 13, 2005

Related U.S. Application Data

(63) Continuation of application No. 09/994,399, filed on Nov. 26, 2001, now abandoned.

(51) Int. Cl.
G06K 9/00    (2006.01)
(52) U.S. Cl. ............... 382/112; 382/135; 382/137; 382/149
(58) Field of Classification Search ........ 382/119–123, 382/115, 116, 112, 187–189, 314; 73/865.4; 178/18.01–20.04; 348/161
See application file for complete search history.

(56) References Cited

U.S. PATENT DOCUMENTS 5,933,526 A * 8/1999 Sklarew ............... 382/189
5,992,601 A * 11/1999 Mennie et al. ............ 194/207
6,269,169 B1 * 7/2001 Funk et al. ............... 382/100

* cited by examiner

Primary Examiner—Jingge Wu
Assistant Examiner—Aaron Carter
(74) Attorney, Agent, or Firm—Joseph E. Funk

(57) ABSTRACT

Apparatus and a method are disclosed for automatically identifying and validating a document, for validating the identity of a bearer of a document, for verifying that the bearer has authorization to participate in an activity represented by the document, and for comparing information on the document against information databases to determine if there are known concerns about the document or its bearer. A document type is narrowed by initially determining the size of the document, and is then identified from amongst a group of documents by looking for colors or other characteristics at specific locations on the document only until the document is identified. The order in which document locations are looked at is dependent upon a history of the types of documents that have been identified. An identified document is verified by first looking up reference information about the document type and using that information to read specific contents and check only specific security and other features utilized on the document. The contents of a document are checked against a database to verify its contents, and other databases are checked for stolen documents, known valid documents, and prohibited travel or entry. Biometrics in databases, on documents and directly from the document bearer are compared to verify the bearer.

7 Claims, 5 Drawing Sheets

VALIDATION AND VERIFICATION APPARATUS AND METHOD

This is a continuation of application Ser. No. 09/994,399, filed Nov. 26, 2001 now abandoned.

FIELD OF THE INVENTION

This invention relates to apparatus and a method for automatically identifying and validating a document, for validating the identity of a bearer of a document, for verifying that the bearer has authorization to participate in an activity represented by the document, and for comparing information on the document against information databases to determine if there are known concerns about the document or its bearer.

BACKGROUND OF THE INVENTION

Over time there has been an increase in counterfeiting and alterations to identity, travel and other documents, such as drivers licenses, passports, identification cards, and passes. In addition, there has been an increase in counterfeiting and alterations to documents having value, such as negotiable instruments, bonds and other similar documents. This has caused concern to the governments and companies who issue such identity and travel documents; and much financial loss where such counterfeit and altered documents are documents of value.

To hinder such counterfeiting and alterations to identity, travel and similar documents, and documents having value, many innovations have been proposed or introduced. One solution has been the development and implementation of new materials for producing such documents that has made counterfeiting and alterations more difficult, and the detection of counterfeit and altered documents easier and faster. Such new materials include the use of holograms and retro-reflective layers in laminating material, invisible information that only appears when illuminated by certain wavelengths of invisible light or other energy, and different types of inks that are seen as one color under normal ambient light but are seen as a different color when illuminated by certain wavelengths of invisible light or other energy (chemical taggants). In addition, magnetic and radio frequency (RF) taggants that are invisible to the eye are added to base materials and laminating materials but may be detected using special equipment. Further, micro-miniature smart chips and memory chips are embedded in such documents, just as they are in smart cards, and may be used to identify, read and validate documents in which they are embedded, and to identify and validate the bearer of such documents.

One example of a security laminating material used for anti-counterfeiting of passports is 3M's Confirm® security laminate described in U.S. Pat. No. 5,658,411. Another example of a 3M security laminating material used for anti-counterfeiting of passports is described in U.S. Pat. No. 5,631,064 and utilizes retro-reflective glass microspheres.

An example of an identity card using smart-card technology has recently been introduced in Malaysia where an embedded computer chip and memory allows the card to be used as a combination identity card, driver's license, cash card, national health service card, and passport.

Coupled with the increase of new materials and new techniques to produce documents that are more difficult to counterfeit or alter, there has been an increase in the demand for new equipment and systems for automatically identifying and validating documents, for validating the identity of a bearer of a document, for verifying that the bearer has authorization to participate in an activity represented by the document, and for comparing information on the document against information databases to determine if there are known concerns about the document or its bearer. This demand has risen because it has become virtually impossible for a person, by themself, to analyze and validate documents using such new materials and other techniques.

SUMMARY OF THE INVENTION

The present invention provides new apparatus and a method for automatically identifying and validating documents, for validating the identity of a bearer of a document, for verifying that the bearer has authorization to participate in an activity represented by the document, and for comparing information on the document against information databases to determine if there are concerns about the document or its bearer.

The use of the new apparatus and methods speeds the process of checking documents, and achieving more accurate verification of a document and its bearer because individual examiners cannot be expected to remember or know all information concerning a plurality of document types. In addition, individuals get tired, distracted or careless and they make mistakes.

The new apparatus and method automatically identifies and authenticates existing, issued documents of different kinds, by checking the intrinsic characteristics of the document and its security features to verify that the documents are not counterfeited and have not been altered. The document's properties may also be used to query the authority that issued the document to confirm its validity.

In addition to identification and validation of the document, information contained in the document may be retrieved and used to validate the identity of a bearer of the document. Also, the current status of a bearer's authorization to engage in a particular activity indicated by the document may be verified, such as to cross a border, check-in to a flight, cash a check, rent a car, purchase a controlled substance, buy hazardous materials, or to enter a secure area. Further, a photo on the document may be captured with sufficient quality to be used for facial matching by machine or human. A picture, signature, fingerprint, iris scan or other biometric information stored on the document may be compared to biometric information received directly from the bearer of the document, and/or compared to biometric information retrieved from a central database. Also, the information obtained from the document and the bearer of the document may be checked against information stored in other local or distributed databases, such as "watch" lists, "wanted" lists, and prohibited entry lists. In this manner, both false identities and identity theft are detected. The certainty of detection then becomes a major deterrent to such crimes.

Finally, real-time auditing and reporting is done relative to the activity that is taking place and all information required to assess the risk of individual patterns of behavior. This information may be stored in a database and used by specific authorities as related to their jurisdictional responsibilities. Protection of the privacy of an individual is protected unless the bearer voluntarily forgoes such protection for added security or as an exception process in the case of a missing document. If there is sufficient reason to suspect illegal activity or the strong likelihood of a future threat, then the appropriate law enforcement agencies may over-ride the normal privacy protection features.

There are several steps involved in implementing the processes described in the previous paragraphs.

The first critical step is to identify the type of document presented. Several examples of documents that can be identified are passports, visas, driver licenses, alien residence cards, and INSPASS cards. The first step in the process uses an image of the presented document to determine the physical size of the document. All documents that may be processed are classified into a plurality of physical size ranges. Upon determining the size of the document from the first image the document type is thereby narrowed down to a smaller set of documents. To further narrow the search the presence of information at specific locations, i.e. test regions, on the document is looked for. For example, the presence of a certain pattern of colors in the test regions is looked for. Using the information found in the test regions on the document the type of document is identified with a high degree of probability.

To speed up document identity analysis, statistical information is collected and used to determine the order in which the test regions on a document are to be checked. For example, if the apparatus is primarily used to check driver licenses and identity cards in a state liquor store in the State of New Hampshire, the document most likely inserted into the apparatus for verification will be New Hampshire drivers licenses and identity cards. Accordingly, as the apparatus is in use, over time, it collects information that most of the time New Hampshire driver licenses and identity cards are verified. Using this statistical information, after a document size range determination is made and the size range includes New Hampshire drivers licenses and identity cards, subsequent checking for the presence of information at test regions on a document will initially look for the presence of such information that is found on New Hampshire documents. Thus, the processing time is typically shortened.

In the second step, using the identified document type, reference information for the document are retrieved. This criterion includes document layout, security features and intrinsic characteristics (documetric) for the identified document type. Using the reference information, data and images are collected from test regions on the document. Some of the data collected will be obtained using optical/intelligent character reading technology and bar-code reading technology. Data and images collected from the document are from areas intended for machine-readability; from human readable areas protected from forgery and tampering and not intended for machine readability; and from areas that are covert and not visible to the unaided human eye. Images are collected from documents using a variety of excitation sources, including infrared, visible and ultraviolet light sources, and polarized light based on the known properties for the specific document type as found in the reference information. Other information may be collected using devices such as ultrasonic, RF or magnetic sensors.

In the third step, the information and images collected from a document are analyzed and compared with known characteristics for the identified document type in the reference information. Images are processed to check the composition of the document, characteristics of the materials, and evidence of any alteration or counterfeiting. Also, classes of documents with known forgery characteristics are specifically examined for the forgery characteristics. At the conclusion of this third step, certain conclusions can be made as to the authenticity of the presented document and a "score" representing the quality of the match between the document and the known properties for that document is calculated. Above a predetermined "score" the document is considered to be a real document in view of the level of analysis performed. Below a predetermined "score" it can conclusively be determined that the document is not valid. Between these scores there is questionable authenticity, and the document bearer and document may be subjected to closer examination.

In the fourth step the data and image information captured from each document may be used to query relevant databases controlled by the issuing authority of the document, or by agencies with lists of known stolen documents, watch lists of wanted or suspected individuals, biometric data for identity matching, data combinations such as arrival and departure locations, suspected combinations of travelers and travel patterns, known issued valid documents, and other pertinent information.

In the fifth step, after the presented document has been validated, then identity verification of the bearer is accomplished linking the bearer to the document. This is done by matching biometric information contained on the document with information measured from the bearer of the document. If the quality of a biometric on the document (such as a photo) and a biometric obtained directly from the bearer at the apparatus are sufficient for matching with a high degree of confidence, then no further examination is required. Should the biometric not match with sufficient confidence, a further match could be made by using the biometric information captured to query the authority that issued the document for their assessment of the match.

DESCRIPTION OF THE DRAWING

The invention will be better understood upon reading the following Detailed Description in conjunction with the drawing in which.

DETAILED DESCRIPTION

Figure 1:
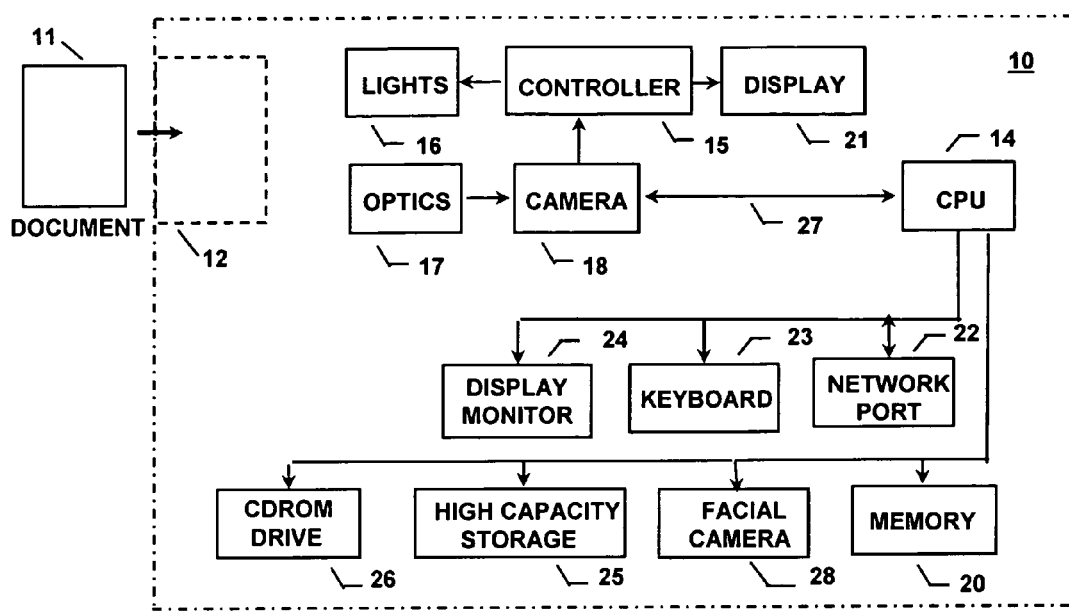
FIG. 1 is a block diagram of the novel validation and verification apparatus used to identify, read and verify documents and their bearers.

In this Detailed Description the operation of our novel validation and verification apparatus 10 in FIG. 1 is described for reading and verifying all types of documents, but with emphasis given to reading and verifying a passport 11. In the description the terms document and passport are both used, often interchangeably. The detailed description uses a passport by way of illustration, but the same apparatus will also read the other types of documents using the same process as described. Other types of documents may be read and verified such as, but not limited to, driver licenses, identity cards, alien residence cards, and INSPASS cards. While documents of value may also be read and verified using the teaching of the preferred embodiment of the invention described herein, such documents of value are not specifically described in detail hereinafter.

On the inside of a passport 11 is located a photograph, bibliographic and possibly other information about the bearer of the passport. This is called the "personalization page." The information on this page includes passport number, issuance and expiration dates, issuing authority, possibly biometric information about the person to whom the passport 11 is issued, and other information.

A piece of thin plastic is laminated to the surface of the personalization page of passport 11 to seal the photograph and information recorded thereon. This plastic laminating material may contain security features such as holograms or retro-reflective materials to provide a measure of security. Laminating, with or without such security features, is done to make it very difficult to alter a passport or to produce counterfeit passports, but passports are still altered and counterfeited despite security measures being taken. Other security measures include affixing holographic seals to the document under the laminating layer, using laminating material that has invisible images therein, use of special inks, use of special paper and imbedded threads, and using paper with a subdued background pattern that is damaged by attempts to alter the passport.

To make it harder to alter or counterfeit documents, new security measures are continually being developed to make it more difficult, if not impossible, to alter or counterfeit documents. Over time such new measures have included the use of chemical taggants to produce different papers, threads, and types of inks to imprint information. These taggants show up differently under lights of different color, including invisible light such as ultraviolet and infrared. These taggants may also be magnetic or have other properties that are not apparent, but which are detectable when using the proper excitation source and sensor. Further, alterations made to documents containing such security materials, that may be invisible to the naked eye, appear when excited with certain wavelengths of light or electro-magnetic energy. Still further, special paper may be utilized that is not visibly damaged by attempts to alter the passport, but the damage can be detected using certain wavelengths of visible and invisible light, or other techniques such as RF or ultrasonic detection.

In FIG. 1 is shown a block diagram of our novel validation and verification apparatus 10. Apparatus 10 has a glass platen 12 onto which a document 11, such as a passport, is placed. The size and shape of platen 12 is chosen according to the intended use of apparatus 10 to accommodate a variety of different types of identity cards, travel documents, resident alien green cards, and other similar documents, such as drivers licenses, passports, identification cards, ingress/egress passes; and documents of value, such as bonds, certificates and negotiable instruments. The CPU 14 and associated peripheral devices illustrate a fully integrated embodiment of the apparatus. The physical apparatus may be constructed including only the elements associated with the camera 18, controller 15, lights 16, optics 17, display 21 and platen 12. In this configuration the apparatus serves as a peripheral to a processor. However, all of the functionality and process steps remain the same.

Lights 16 comprise a plurality of visible and invisible light sources or other excitation means of different wavelengths. These sources include, but are not limited to, visible light, near infrared (IR), long and short wave ultraviolet (UV), from arrays of light emitting diodes (LEDs), RF and ultrasonic, solid-state emitters, transducers, gas discharge, incandescent, and/or fluorescent sources. The emission from each of which may pass through a diffuser medium or focusing mechanism (not shown) to illuminate the page of document 11 on platen 12. A special instance of these lights 16 uses near-infrared (IR) and blue light from light emitting diodes to emulate a point source of light and illuminate a laminated page of the document. Such illumination is done coaxially with the path the reflected light travels to camera 18. Camera 18 has an operational frequency range that is able to image 400 nanometer to 1 micron, visible to near-IR. It can also be enhanced with transluminance materials to shift the response range to detect frequencies outside this range. The capabilities of camera 18, as shown, may also be extended to add filters or include transducers sensitive to frequencies in any range.

In addition, all light sources have programmable output intensities and LED sources may be pulsed to achieve higher peak power levels that provide greater illumination of the document and to help to expose security markings and unauthorized alterations at different levels within the passport. The frequency of pulsing the IR and blue light LEDs is high enough that the pulsing cannot be detected by camera 18. The light from the sequentially energized multiple light sources 16 is reflected from the laminated page of passport 11 on platen 12 and impinges on optics 17 which focuses the image for camera 18. The optics 17 can also be used to split the optical path to support multiple cameras/detectors and/or provide filtering to band limit the spectral content reaching the camera.

In this embodiment camera 18 is a high-resolution, color, solid-state camera that is controlled by CPU 14, and produces a digitized color picture. Camera 18 and near-IR light 16 are continuously operating while apparatus 10 is powered up and awaiting detection of a document. When apparatus 10 is to commence functioning, the presence of a document 11 on platen 12 is imaged by camera 18 and a first picture is sent to CPU 14 via an interface link 27. Link 27 is a high-speed, digital interface such as conforms to the IEEE 1394 standard, high-speed Ethernet, or a universal serial bus (USB), or other future protocols. The color picture is in a digitized format and CPU 14 stores it in a memory queue. In some instances gray scale pictures may be utilized. In other applications where color is not needed a monochrome camera may be utilized.

A local high capacity storage device 25 may store information such as document reference information files and image reference files, and a program run by CPU 14 to control the operation of validation and verification apparatus 10. Alternately, document reference information files and image reference files and other material may be filed in and accessed from a remote server. As the capability to check new document types is added to apparatus 10, and new and/or updated information about existing document types or security checks becomes available, that new or updated information is stored on storage device 25 from either a detachable CDROM drive 26 or from a remote server (not shown) via network port 22. Like all computers, there is memory 20 that comprises static and dynamic memory and it functions with CPU 14 in a well-known manner. In addition, network port 22 can be used to connect apparatus 10 to a server on a local area network (LAN) or wide area network (WAN) to record the time and date that the bearer of a passport is entering or leaving a country, and transfer other information retrieved from a document, and to communicate with authorities responsible for databases used for verifying and validating the document and its bearer, and to check if the bearer of the document is on a prohibited entry or wanted list ("watch list").

Apparatus 10 also includes a display 21, which may include a touch-screen for response, to provide indications to the either the operator of apparatus 10 or to a person whose document is being checked, such as the validity or invalidity of document 11, validating or invalidating the identity of a bearer of the document, verifying or not verifying that the bearer has authorization to travel using the document, and indicating detection of an altered or counterfeit document. A separate display may also be provided for persons whose documents are being checked. There is also a display monitor 24 that may be used for a number of purposes including displaying to an operator more detailed information generated by apparatus 10, and pictures and other information retrieved from a remote network of computers via network port 22. In addition, there may be a keyboard 23 that is used by the operator to manually input information to apparatus 10.

In some applications apparatus 10 is in a stand-alone operation, such as at a point of ingress or egress, and a bearer of a document 11 places it on apparatus 10 to be verified and granted permission to enter or depart. If document 11 is not verified a visual and/or audible indication may be provided to the bearer of a document 11 to take some action, such as reporting to some other location for verification.

Other apparatus may be provided as required by specific applications, such as a bar code reader, a magnetic stripe reader, iris reader, a signature capture device, gate controller, and/or a smart card reader, all of which are not shown in FIG. 1.

Figure 2B:
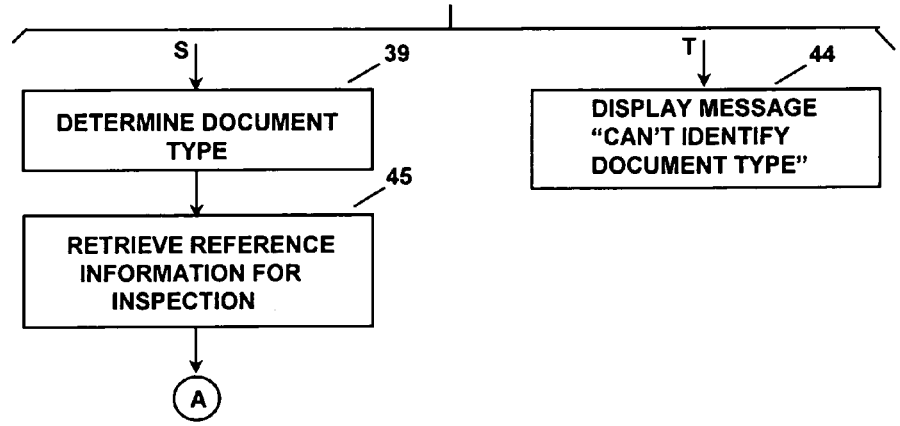
FIGS. 2A & 2B are a block diagram showing the steps involved in determining a document type.
Figure 2A:
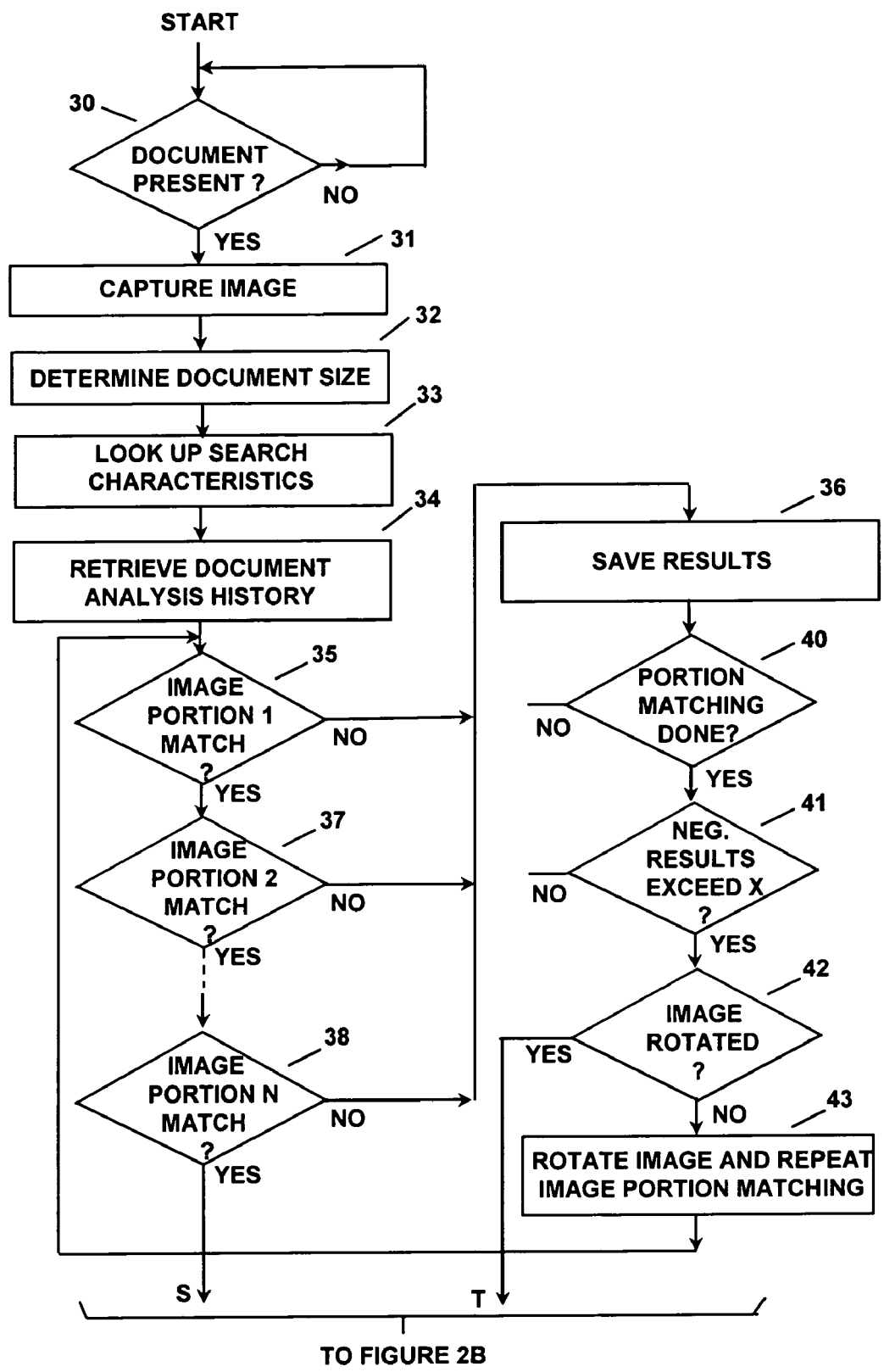

In FIG. 2 is a general block diagram showing the program steps involved in determining a document type. At block 30 it is determined if there is a document 11 on platen 12. Camera 18 and a light 16 (IR) remain on to detect the presence of a document on platen 12 by a change of the digital image output from the camera. A light 16 (visible) is energized until a first image is captured of document 11. While the presence of document 11 is not detected the program exits block 30 at NO and continuously cycles back to the input of block 30. Once something is detected on platen 12 the program exits block 30 at YES and progresses to block 31 where the first image is captured for processing to determine what type of document is on platen 12.

At block 32, the first picture is analyzed to locate its edges and from this the document size is determined. All documents that may be processed by apparatus 10 have a physical size and apparatus 10 determines the document size to be within one of a plurality of pre-selected size ranges, and there is a specific set of test regions and characteristics for each stored for the documents in each size range.

Upon determining the physical size of document 10 from the first image, the physical size range in which the document is located is identified, and apparatus 10 has thereby narrowed down the document to be one of a smaller set of documents. To further narrow the search, the presence of information at specific test regions on the document are looked for. For example, the presence of certain color patterns in specific test regions. The information found at the specific test regions on the document is used to identify the type of document. If, within the aforementioned smaller set of document types, there is only a single document type that has specific information present at a test region, and the information is actually present at the test region in the first picture, the document type is ascertained with a very high degree of confidence and there is no need to check for the presence of information at the other test regions on the document. However, if a few document types have similar information present at a specific test region, the number of possibilities of the document type has been narrowed, but the document type has not yet been ascertained. Thus, the presence of second specific information is looked for in a second test region in the first picture. If there is only a single document type that has the second specific information present at the second test region, and the information is actually detected in the second test region, the document type is ascertained with a very high degree of confidence and there is no need to check for the presence of additional information in the first picture. Only if necessary, this process may be repeated for more specific information at additional test regions on the document, but the process is terminated as soon as the document type is ascertained with a very high degree of confidence. In this manner, testing to determine a document type is kept to a minimum.

At block 33 a set of characteristics for the ascertained document size range are read from the master document file. At block 34, a description of the types of documents that have been ascertained of the same size as document 11 is retrieved from master document file. As apparatus 10 is operated at a specific site over time certain types of documents will be analyzed more often than others. For example, if apparatus 10 is used to check driver licenses and identity cards at a state liquor store in the State of New Hampshire, the probability is that documents inserted into the apparatus for verification will be New Hampshire driver licenses and identity cards. Accordingly, over time the apparatus will collect information that most of the time New Hampshire driver licenses and identity cards are ascertained and verified, and possibly drivers licenses more often than identity cards. Using this statistical information, after a document size range determination is made for a document, and the size range includes New Hampshire drivers licenses and identity cards, the subsequent checking for the presence of information at test regions on the document will initially look for the presence of such information that is found first on New Hampshire drivers licenses and then on identity cards. If a document is not ascertained to be one of these two types of documents, processing will continue for other types of documents in the size range. Thus, the processing time is typically shortened.

Using the information read in blocks 33 and 34, and following a search ordering set by the statistical information, at block 35 the information from the first test region in the first picture is analyzed to determine if the information matches the retrieved characteristics for that region. If there is no very high confidence match the program progresses to block 36 and saves the match confidence determined.

If there is a very high confidence match, the program progresses to block 37 where the image information in the second test region in the first picture is analyzed to determine if the information matches the retrieved set of characteristics for that test region. If there is no very high confidence match the program stores the match confidence determined at block 36. This process repeats through a number of iterations as defined by a retrieved set of document definitions. At block 38 the digital image information for the last (Nth) region in the first picture is analyzed to determine if the information matches the set of characteristics for the Nth region. If there is no very high confidence match the program again stores this determination at block 36.

If there is a match the program progresses to block 39 where the document type is ascertained to a very high degree of confidence using the results of the image matching. Using the ascertained document type the program progresses to block 45 and retrieves a document definition file that is used in analyzing and verifying the document as described with reference to FIG. 3.

At block 40 the program determines when the image matching is complete. When complete, at block 41 it is decided if any of the confidence reports from blocks 35, 37 and 38 exceed a predetermined minimum threshold. If any do, then the reference documents highest 3 (configurable number) scores are checked against document 11 using the secondary characteristics and test regions as specified in their respective document definition file. The process is the same as steps 36–40. This procedure is followed until it has either been determined that a document is a specific type to a very high degree of confidence or the operator is notified that the type is questionable.

If none of the confidence reports exceeds the minimum threshold this means either document 11 on platen 12 is not placed thereon in the correct orientation, the document is in too poor a condition for recognition, or the document type is not included in the master document file of apparatus 10. It is virtually impossible to mis-orient a passport, however, that will not be the usual case for the smaller ID cards. It is then determined at block 42 if the first image is not a passport-size and has already been electronically rotated one-hundred eighty degrees.

If the image has not been previously rotated, at block 43 the image is electronically rotated one-hundred eighty degrees and the program returns to block 35 and the analysis formed at blocks 35, 36, 37, 38, 40, 41 and 42 is repeated. If the document type still cannot be ascertained a message is displayed "Can't Identify Document Type". If the image has not previously been rotated, as determined at block 42, it is clearly determined that the document type is not included in the database, and the program progresses to block 44 where a message is forwarded, "Can't Identify Document Type". Thus, apparatus 10 will notify all interested parties that other action must be taken to resolve the matter.

If after electronically rotating the first picture, apparatus 10 can identify the document, processing of the document continues using the rotated image. Using the ascertained document type, the program progresses to block 45 and retrieves a document definition file from which inspection criteria are retrieved to be used in analyzing and verifying the document as described with reference to FIG. 3.

Figure 3:
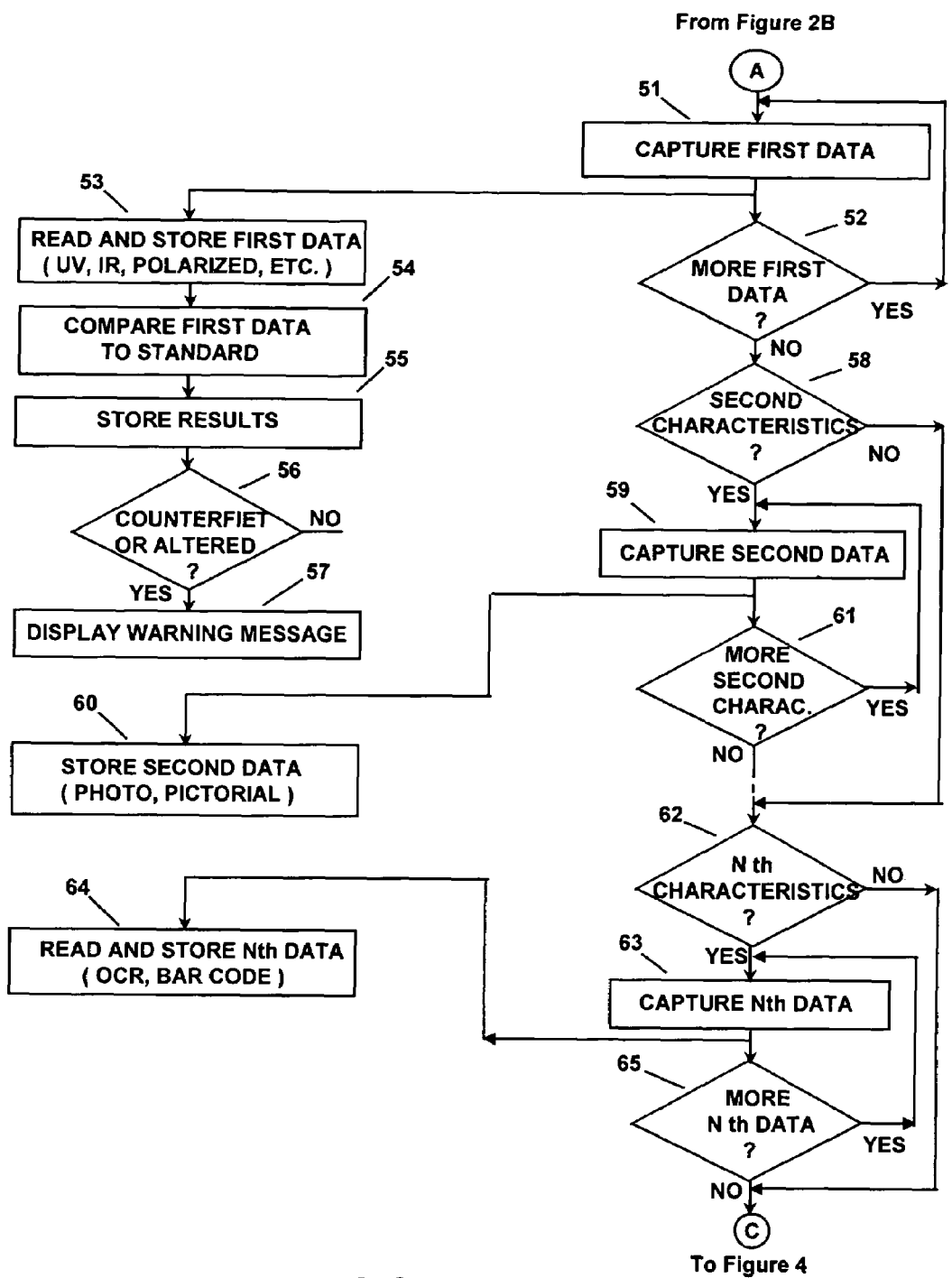
FIG. 3 is a block diagram showing the steps involved in reading and capturing data from a document and determining if the document is counterfeit or has been altered.

FIG. 3 is a block diagram showing the steps involved in reading and capturing data from the document, and testing to determine if a document is valid, counterfeit or has been altered. To simplify this figure the operation is described with reference to three basic types of data to be obtained from documents. The first information type is obtained from images created using ultraviolet, infrared, direct, polarized light, etc., where one or more additional images are obtained and then processed to derive data therefrom. The second information type is pictorial or graphic information on documents, such as photo, fingerprint, or seal, and is captured directly from the document image. The third information type is data read directly from an image on the document by optical character reading (OCR), intelligent character recognition (ICR), bar code interpretation, etc. In some instances data may be derived from the other images of the document, when such information becomes visible under a special light. There may be more than one type of information in each of these data types, such as OCR, ICR and bar codes being on the same document. In addition, for information not found in any of the images, there may a magnetic stripe read by a magnetic stripe reader, RF reader, ultrasonic reader or a smart card reader. Different steps shown in FIG. 3 occur in parallel so the processing time is minimized.

Information in a standardized format is often located in fixed machine-readable zones ("MRZ") on a document such as established under ICAO 9303 or ISO-7501 standards. If an MRZ is detected, CPU 14 uses an optical character reading (OCR) technology to "read" the alphanumeric information in the MRZ field. By analyzing information in the MRZ field, CPU 14 is able to determine if the document is a passport, or another type of document that includes an MRZ field. Such MRZ information may include, but is not limited to, the name, birthday, sex, place of birth of the person to whom the document is issued, the date of issuance and expiration of the document, the issuing authority, issue run, and document number. This information may also be encrypted and placed in bar codes or on microchips on documents, and used as a double check against visible information to verify that a document is not a forgery and/or has not been altered. In addition, laser readable material, invisible to the human eye, may be placed on the document which is written and read like a CDROM, but is written and read in rows, and may contain data visible elsewhere on the card, or encoded fingerprints, hand-geometry, iris scans, retinal scans, and other biometric information.

Certain inks, such as those containing carbon black, absorb infrared light. Other inks do not absorb infrared light, but are transparent to it or reflect it. Both may appear to be the same color under normal light.

Printing on a document is generally in black, but MRZ items on the document will be printed with the special near-IR absorbing (B900) black ink to conform to international standards. When illuminated with a near-IR source this latter printing will appear, while all other printing disappears. CPU 14 knows where to look for the special ink printing in a digitized image made under illumination of the near-IR source from the retrieved document definition file. If the near-IR responsive images are in the specified areas, whether they are alphanumeric text or certain patterns or images, they will be identified by CPU 14 as an indication that the passport 11 in document reader 10 has not been photocopied.

A long wave ultraviolet (UV-A) light causes certain inks and fibers to fluoresce, so they are visible within the image captured by camera 18 using this light source. A short wave ultraviolet (UV-C) causes other special inks and fibers to fluoresce, while all other areas on the document image disappear, including those made with materials that fluoresce under UV-A. In addition, alphanumeric characters and symbols may be printed on passport 11 or other documents with inks that are not visible to the human eye, but which appear when illuminated with a UV light source. These symbols may be printed on the portion of the passport that is laminated, or may be imprinted in or on the laminating material. From the retrieved document definition file CPU 14 knows where to look in a digitized picture captured from a document for the symbols that are visible when illuminated under a UV light source.

Document definition files include document layout (location of different types of information and pictures on a document), security features (such as information visible with ultraviolet, infrared, direct blue, and polarized light) and intrinsic characteristics (documetric) specific to the process or materials used to manufacture the document. Using retrieved document definitions, only selected ones of the UV, IR and other images are captured, and only specific regions in the images will be analyzed. In addition, images are obtained using infrared, ultraviolet or other wavelengths of light; or polarized, coaxial, or light incident at specific angles at resolutions adapted to provide the best analysis for the type of data being read. These additional images are processed to obtain further data on the document, for checking the authenticity of the document, and for determining if the document has been altered or is a counterfeit.

The reason that all possible images of a document are not captured sequentially is that all documents do not include features that require obtaining images using all of the combinations of excitation sources or camera resolutions available. In this way only required images are obtained and the document processing time is minimized.

In FIG. 3, at block 51, first data is captured by taking an ultraviolet, infrared, polarized etc. picture of document 11 as established by the document definition file for that document type. Assume that at block 51 an ultraviolet image is obtained first. At block 53 first data information made visible by the ultraviolet light is read and stored. Merely seeing if it is visible at specific locations on the document, or if the information made visible may be read using another technology such as optical character reading, barcode reading, or image recognition may check the information. At block 54 the information obtained using the ultraviolet picture, as described in the previous sentence, is compared to reference information from the document definition file. At block 55 the weighted results of the comparison are saved.

At block 56 a decision is made if the result of the comparison of the information obtained using the ultraviolet image and the reference information from the document definition file indicates the confidence level that there is a match or, conversely, indicates the possibility that the document is a counterfeit or has been altered.

At the same time that the ultraviolet picture is being read and analyzed, a decision is made at block 52 if there are more first data pictures to be obtained and analyzed. If there are more first data pictures to be obtained the program branches back to the input of block 51 to again capture a first data picture, such as an infrared picture to be used, for example, to check for the use of certain carbon based inks on the document, or for alterations to the document. At block 53 information made visible by the infrared light is read and saved. Merely seeing if information is visible at specific locations on the document, or if the information made visible may be read using another technology such as optical character reading, and barcode reading may check the information. At block 54 the information obtained using the infrared picture is compared to standard reference information from the document definition file. At block 55 the weighted results of the comparison are saved.

When the coaxial light sources are used in the detection and verification of retro-reflective materials contained in documents the use of an image, if any, in the retro-reflective material may be viewed, and the image, if any, may be compared to a reference image from a document definition file that is retrieved from storage, either locally or remotely. One example of such retro-reflective materials is 3M's Confirm material that is described in more detail in the following paragraphs.

When 3M's Confirm laminate is illuminated with coaxial IR light the image captured is a continuous gray and an embedded logo does not appear. It looks like a clean, gray slate. The continuous gray is easily detected as an indication of the presence of the Confirm material. Any alterations to and tampering with the Confirm laminate appear as black marks on the gray background and are easily detected. Further, at increased power levels, the light is reflected from the bottom surface of the laminate or the surface of the document which is laminated in a manner that reveals the use of unauthorized laminates, and alterations to the laminate. In addition, when viewing the Confirm material, IR coaxial illumination is not affected by normal scuff marks and scratches, fingerprints and dirt on the surface of the laminate.

A direct blue light source generated by an array of blue LEDs is specifically used to verify that 3M's retro-reflective Confirm® material is used as the laminate, and has not been tampered with. Under this blue light a white logo is seen against a gray background. This is easily detected by analysis of the image produced, and can be read using optical character reading. Such logos are combinations of words and graphics that are distinctive to the country or issuer of the passport or other type of document and are compared to words and graphics in the document definition file for the document. The logo is invisible to the naked eye. Any attempts to forge the 3M laminate, or to use another laminate, are obvious.

At the same time that the image is being read and analyzed, using the document definition file a decision is made at block 52 if there are more first data pictures to be obtained and analyzed. If there are no more first data pictures to be captured the program branches from block 52 to block 58 were it is determined if there are any second data type pictures to be captured. If there are none, the program branches directly to the input of block 62. When there are second data type pictures to be captured, per the document definition file, the program advances to block 59 and a photo or other pictorial information on the document at a specifically defined location is taken from the first picture and, at block 60, is stored. Typically, it will be a photograph on the document that is captured and saved for other purposes such as comparison with the bearer of the document by an attendant or by a computer using an image of the bearer's finger/or information in a database using facial recognition technology.

At the same time a photograph image or other pictorial information is being stored at block 60, using the document definition file a determination is being made at block 61 if there is another second data type picture to be captured, such as some graphic located on the first image of the document. If there is, the program cycles back to the input of block 59 to image the graphic at its specifically defined location. At block 60 the graphic is stored.

In the event that there are no additional second data type pictures to be captured, the program progresses to the input of block 62 where, using the document definition file, it is determined if there are any Nth data type information to be captured from the first picture, such as the OCR of characters or reading a bar-code data, as indicated by the document definition file. When the decision made is that there are no Nth data type information to be saved, the program branches from block 62. Upon the decision being made at block 62 that there is Nth data type information to be saved, the program branches to block 63 where the Nth data type information at a specified location on the document is captured from the first image. At block 64 the information is read and stored. If the information is alphanumeric text it is read using OCR and the information saved. If the information is in barcode form the barcode is decoded and the information derived therefrom is saved.

At the same time that a first Nth data type information is been retrieved from the first image, read and saved, at block 65 the program makes a determination using the document definition file if there are any more Nth data information to be read and saved. If there is, the program branches from block 65 back to the input of block 63 to capture and read the Nth data information. For example, the first Nth data information is alphanumeric text that is read using OCR and the second Nth data information is a bar code that is read.

When there is no more Nth data information to be read and saved the program exits block 65. At this time all images have been captured, all data read therefrom saved, and a decision now can be made as to the document validity based on the scoring to the degree to which the document matches the reference information in the document definition file.

Figure 4:
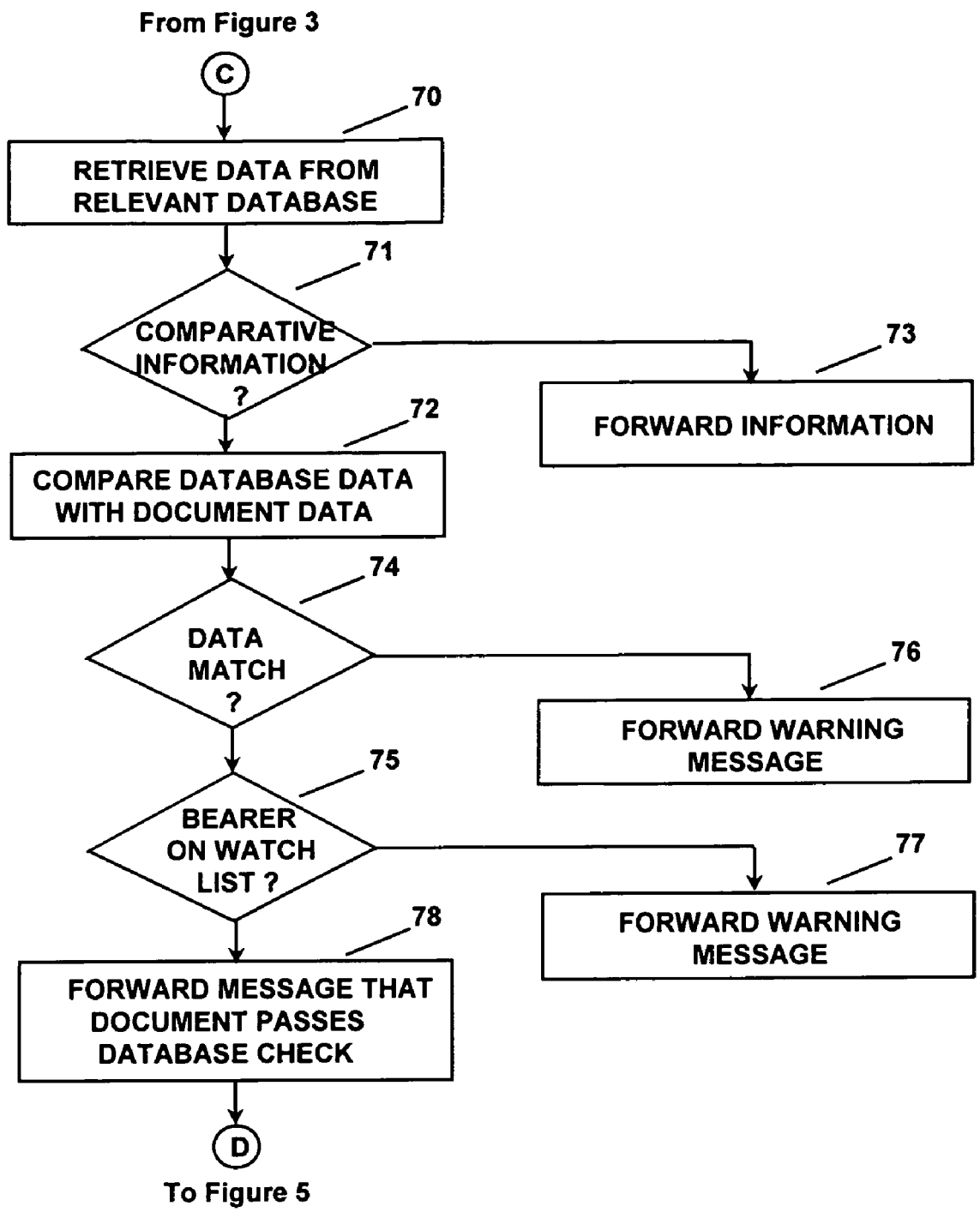
FIG. 4 is a block diagram showing the steps involved in comparing data on a document with reference data and data in databases, and determining if the document bearer is on a watchlist.

In FIG. 4 is a block diagram showing the steps involved in further validating a document and verifying the identity of the bearer by comparing data derive from the document with data in databases, determining if the document bearer matches the biometrics on the document (typically the photograph), if the bearer is on a watch list, wanted list, or is on a prohibited entry list. At block 70 the information retrieved from the document in FIG. 3 is used to access databases related to the type of document being verified as specified in the document definition file or established in a master control file by the organization managing the operation of the system.

At block 74 a determination is made if there is a match between the two sets of information. The database information being compared may be a positive or negative indication of the document validity or their identity. The results are scored and used as a part of the overall evaluation of the document and the bearer.

Completion of the match test between the sets of information causes the program to progress to block 75 where other databases are accessed to determine, for example, if the bearer of the document is not in the issuing authority database, or is on a watch list of any type. While not shown in FIG. 4 these other database tests might include: (1) checking if the bearer of the document is wanted for any crimes, (2) checking the document against lists of stolen documents, (3) analysis of data combinations such as arrival on departure locations, (4) checking for prohibited entry individuals, and (5) matching suspected combinations of travelers and travel patterns. If the bearer of the document is on a watch list or wanted for any crimes, the program branches to block 77 to notify the appropriate authorities.

Figure 5:
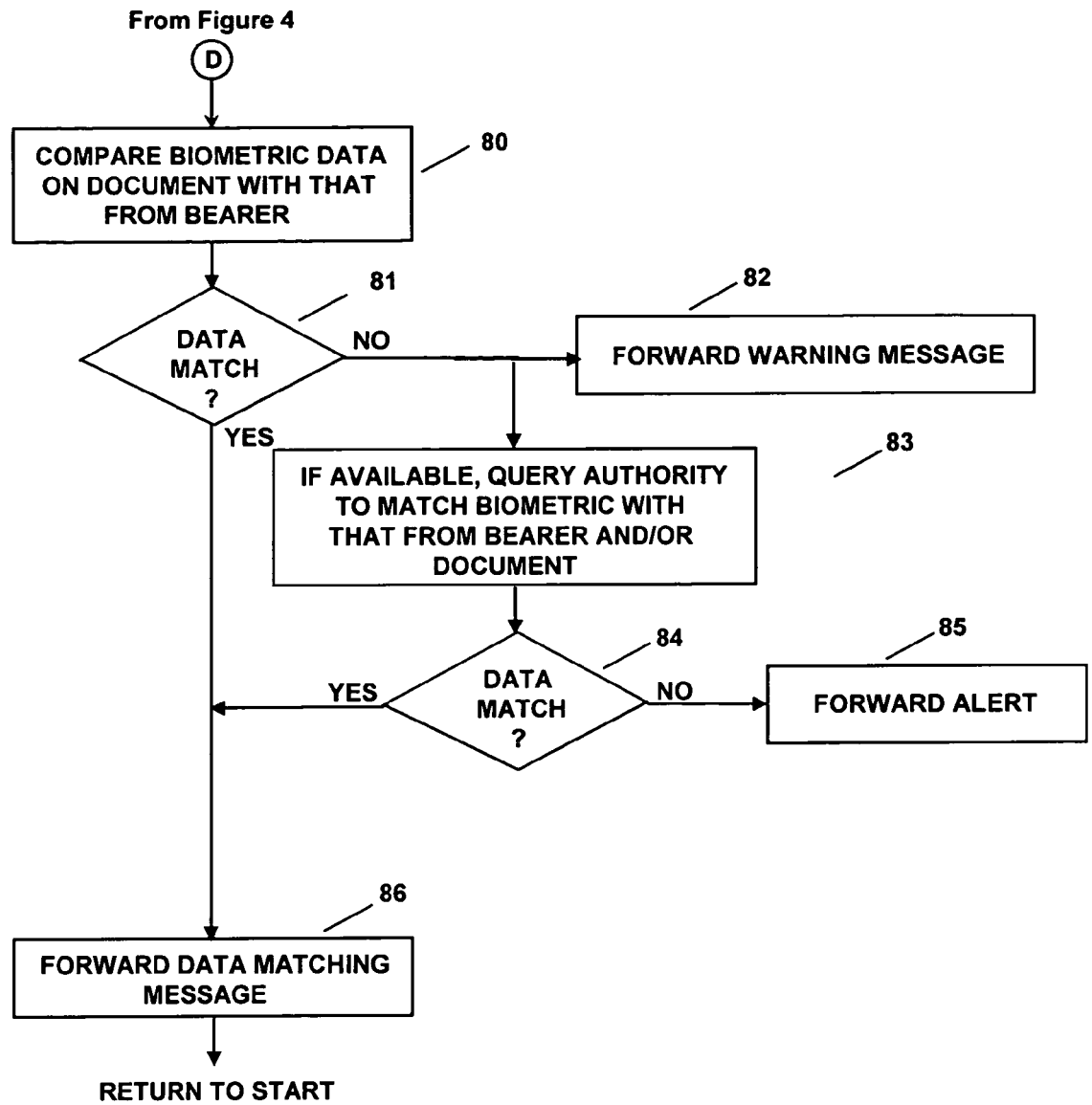
FIG. 5 is a block diagram showing the steps involved in retrieving and comparing biometric data on a document, in a database and directly from the document bearer.

In FIG. 5 is shown a block diagram of the steps involved in comparing biometric data on a document with that received directly from the document bearer. The purpose for this comparisons is to validate the bearer of the document and to check against biometric "watch lists". To implement this comparison a camera, a fingerprint scanner, and/or an iris scanner, microphone, or signature capture device must be located with apparatus 10. A decision is made at block 81 whether or not there is a match. When there is a match the program progresses to block 86 to display a message that there is a biometric data match. The program then returns to its start in FIG. 1.

If there is no biometric data information, this determination is made at block 81. The no match determination may be due to an altered or counterfeit document, but may also be due to the fact that the biometric data on the document (such as the photo) is unusable. At block 82 a warning message is given to the operator of apparatus 10 or the appropriate authorities. In addition, the program progresses to block 83 to query the issuing authority of the document or other authority requesting that they or their appointed trust authority match the data and biometric and return the results. The biometric data from the document and/or from the bearer may be used, along with data from the document, and are forwarded to the authority that will be performing the match.

At block 84 the match results from the trust authority are checked to determine if there is a data match. If there is no data match, the program progresses to block 85 where an alert is given to the operator of apparatus 10 and/or the appropriate authorities. Upon it being determined at block 84 that there is a match, the program progresses to block 86 to display a message that there is a biometric data match. The program then returns to its start in FIG. 1.

In addition to biometric data matching, biometric information retrieved directly from the document bearer and/or from the document may be compared against a biometric "watch list". If it is determined that the document bearer is on a biometric "watchlist", an alert message is given to the operator of apparatus 10 and/or the appropriate authorities.

At this point apparatus 10 has verified both a document and the bearer of the document, and has verified that the bearer has authorization to participate in an activity represented by the document. The program running apparatus 10 returns to its start state in FIG. 2 and is ready to check another document.

While what has been described herein is the preferred embodiment of the invention, it will be understood by those skilled in the art that numerous changes may be made without departing from the spirit and scope of the invention.

We claim:

1. A method for automatically processing documents of many different classes and types that are randomly presented to first identify the class of each document, then identify the type of document within an identified class of documents, the method comprising the steps of:
   (a) capturing a complete representation of an entire document that is presented to be identified;
   (b) determining a first characteristic for each document presented to be identified using its complete representation captured in step (a), the first characteristic being used to identify one class of document from another class of document;
   (c) retrieving a set of second characteristics for each document presented to be identified whose complete representation is captured in step (a) and whose class of document is identified in step (b), the second set of characteristics being used to identify the type of document from amongst the class of documents identified in step (b); and
   (d) analyzing individual characteristics from the second set of characteristics retrieved in step (c) with characteristics actually in the complete document representation captured in step (a) to identify the type of document from amongst the class of documents identified in step (b);
   wherein the determination of a first characteristic performed in step (b) is to determine the size of an document being processed, all documents that may be identified and verified are divided into size ranges and each class of documents includes all documents having the same size, and
   wherein the second set of characteristics retrieved in step (c) include color patterns at specific locations on documents.

2. The method for automatically processing documents according to claim 1 where identified documents are to be verified, and further comprising the steps of:
   (e) retrieving a set of reference information unique to each type of document that is identified in step (d); and
   (f) analyzing each document whose complete representation is captured in step (a) using the unique set of reference information retrieved in step (e) to verify if the type of document identified in step (d) is genuine, counterfeit, or has been altered.

3. The method in accordance with claim 2 further comprising the step of: (g) providing an indication that an document is genuine, counterfeit or has been altered based upon the results of analysis performed in step (f).

4. The method for automatically processing documents in accordance with claim 1 further comprising the steps of:
   (e) ordering all document types that are identified in step (d) from the most commonly identified type of documents to the least commonly identified type of documents and
   (f) selecting the retrieved characteristics from step (c) for use in step (d) starting with characteristics for the most commonly identified document type and progressing to the least commonly identified document type.

5. The method for automatically processing documents according to claim 4 where identified documents are to be verified, and further comprising the steps of:
   (g) retrieving a set of reference information unique to each type of document that is identified in step (d); and
   (h) analyzing each type of document identified in step (d) using the unique set of reference information retrieved in step (g) to verify if it is genuine, counterfeit, or has been altered.

6. A computer readable medium containing executable instructions for automatically processing documents of many different classes and types that are randomly presented to first identify the class of each document, then identify the type of document within an identified class of documents, the executable program instructions comprising program instructions for:
   (a) capturing a complete representation of an entire document that is presented to be identified;
   (b) determining a first characteristic for each document presented to be identified using its complete representation captured in step (a), the first characteristic being used to identify one class of document from another class of document;
   (c) retrieving a set of second characteristics for each document presented to be being identified whose complete representation is captured in step (a) and whose class of document is identified in step (b), the second set of characteristics being used to identify the type of document from amongst the class of documents identified in step (b);
   (d) analyzing individual characteristics from the second set of characteristics retrieved in step (c) with characteristics actually in the complete document representation captured in step (a) to identify the type of document from amongst the class of documents identified in step (b);
   wherein the determination of a first characteristic performed in step (b) is to determine the size of a document being processed, all documents that may be identified and verified are divided into size ranges and each class of documents includes all documents having the same size, and
   wherein the second set of characteristics retrieved in step (c) include color patterns at specific locations on documents.

7. The computer readable medium executable instructions of claim 6 further comprising instructions for:
   (e) retrieving a set of reference information unique to each type of document that is identified in step (d); and
   (f) analyzing each document whose complete representation is captured in step (a) using the unique set of reference information retrieved in step (e) to verify if the type of document identified in step (d) is genuine, counterfeit, or has been altered.

* * * * *